United States Patent [19]

Duckworth

[11] Patent Number: 4,787,254

[45] Date of Patent: Nov. 29, 1988

[54] MASS FLOW METER

[75] Inventor: R. Alan Duckworth, Farnham, England

[73] Assignee: Briggs Technology, Inc., Pittsburgh, Pa.

[21] Appl. No.: 16,876

[22] Filed: Feb. 20, 1987

[51] Int. Cl.⁴ ............................................. G01F 1/42
[52] U.S. Cl. ................................................. 73/861.62
[58] Field of Search ............ 73/861.61, 861.62, 861.63

[56] References Cited

U.S. PATENT DOCUMENTS

| | | | |
|---|---|---|---|
| 1,697,344 | 1/1929 | Campbell | 73/861.61 |
| 3,204,459 | 9/1965 | Lehrer | 73/861.63 |
| 3,817,100 | 6/1974 | Anderson et al. | 73/861.63 |
| 3,896,670 | 7/1975 | Converse, III et al. | 73/861.63 |

FOREIGN PATENT DOCUMENTS 440976  1/1936  United Kingdom ............ 73/861.61

*Primary Examiner*—Herbert Goldstein
*Attorney, Agent, or Firm*—Parmelee, Miller, Welsh & Kratz

[57] ABSTRACT

A mass flow meter includes a hollow base pipe having an inlet adapted to be attached to the discharge line of an air compressor or like apparatus to be tested. The base pipe also has an outlet end which is fitted with one of a plurality of convergent nozzles of differing, known throat diameters. A pressure gauge is fitted to the base pipe, upstream of the nozzle, to sense the pressure therein. The pressure gauge has ring-shaped mass flow rate indicia thereon which are individually calibrated to conform to each of the sized nozzles to permit direct reading of mass flow rates as a function of pressure.

2 Claims, 2 Drawing Sheets

TYPICAL PERFORMANCE CHARACTERISTIC
OF A 175 CFM 100 PSI AIR COMPRESSOR

MASS FLOW METER

BACKGROUND OF THE INVENTION

The invention relates generally to fluid pressure and flow rate measuring devices and, more particularly, to apparatus for determining mass flow rates of compressible fluids, such as air, discharged from an air compressor, for example.

Heretofore, the experience of air compressor users, such as construction contractors and the like, suggests that there is a need for a convenient and relatively simple method for the determination of the pressure-mass flow (in cubic feet per minute or "CFM") relationship of compressors operating in the field. Oftentimes air compressors become inefficient after long usage and/or poor maintenance which can lead to unsafe and/or inefficient operation of the tools or implements which are pneumatically operated thereby. The measurement of the mass flow of compressible fluids, such as air, normally requires that both the density of the fluid and the volumetric flow rate be independently measured. However, by using the device of the present invention, the flow rate may be quickly and easily measured in the field by means of a pressure gauge or transducer, so calibrated with various nozzle means that it provides both the pressure and the mass flow rate.

The present invention provides a relatively fast and simple method and apparatus for measuring compressor performance in the field to permit owner/operators to periodically monitor the working output of the compressors, which heretofore has not been practical or easily accomplished.

SUMMARY OF THE INVENTION

The mass flow meter device of the present invention comprises a tube-shaped base pipe which has inlet and outlet ends with a hollow bore extending therethrough. The inlet end of the base pipe is adapted to be attached to the discharge pipe of the air compressor to be tested. The outlet end of the base pipe includes a threaded locking collar, which is adapted to securely hold in place one of a plurality of converging nozzles thereon. The nozzles each have formed therein a convergent throat portion at its outlet end of a given diameter, which is sized to produce a range of pressure and calculated mass flow rate or CFM readings on a calibrated pressure/CFM gauge which communicates with the bore of the base pipe, upstream from the nozzle. The pressure gauge has a face plate with graduated values imprinted thereon for reading the air pressure in psi. The face plate also has a plurality of concentrically arranged ring-shaped, dial indicia in graduated form for reading mass flow rates in CFM. Each ring of CFM indicia has calculated values corresponding to a unique range of pressures for each of the plurality of nozzles. For example, when four nozzles of varying throat diameters are employed, the face plate of the pressure gauge carries four concentric rings of dial indicia for reading mass flow rate, wherein each ring corresponds to one of the four nozzle diameters.

By using the known concept of choked nozzle flow (sonic) conditions, for which the ratio of the absolute pressures upstream and downstream of a nozzle should be equal or greater than 1.89, the flow rate is measured by means of the pressure gauge, so calibrated that it gives both the pressure and the mass flow rate for a given nozzle area.

A pressure and mass flow rate reading is taken for each of the four nozzles sizes and a simple graph can then be plotted showing the actual performance characteristic of an air compressor in terms of its actual discharge pressure versus mass flow rate in CFM.

BRIEF DESCRIPTION OF THE DRAWINGS

These and other features and advantages of the present invention will become apparent when reference is made to the accompanying drawings and the detailed description, wherein.

DETAILED DESCRIPTION OF THE INVENTION

Figure 1:
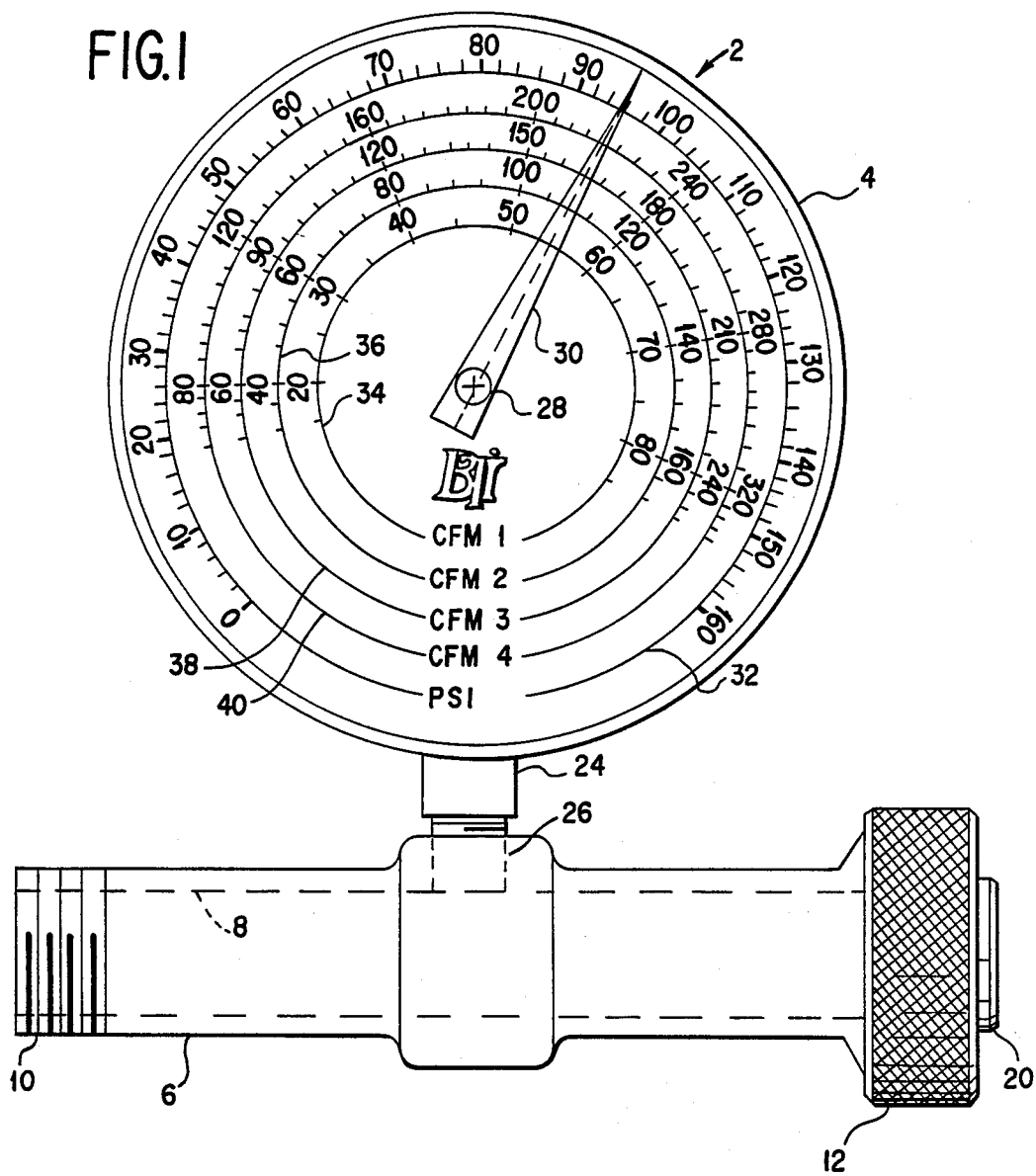
FIG. 1 is a side elevationsl view of a mass flow meter constructed in accordance with the present invention.

In the operation of certain pneumatic tools, such as the unique supersonic air excavation tool disclosed in copending U.S. patent application Ser. No. 877,280 of Aubrey C. Briggs, it is imperative that a sufficient pressure and mass flow rate of air be delivered to the tool in order for it to function in the supersonic regime. If the air pressure and mass flow rate should fall below the specified minimum values, the subject tool no longer can achieve supersonic velocity and its efficiency as an excavation device is greatly diminished. Through usual wear, rough handling and general abusive field conditions, portable air compressors begin to leak with the passage of time and should be monitored and replaced if they are employed in critical work environments such as the above-referred to supersonic air excavation tool application. Of course, in other more conventional applications, such as with a pneumatic jackhammer, a substandard operating air compressor will tend to lower the efficiency of that tool as well, but to a lesser extent. It is therefore desirable in field operations to be able to determine in a simple manner if the air compressor is, in fact, operating at its rated capacity.

Referring to the drawings, the mass flow meter 2 of the present invention permits the field evaluation of air compressors in a simple and efficient manner, as will be described in greater detail below.

The mass flow meter 2 comprises a tube-shaped base pipe 6 which has a bore 8 passing therethrough. The pipe 8 has a threaded inlet end 10 which is adapted to receive a threaded quick-disconnect type fitting thereon which, in turn, is adapted to attach to a like quick-disconnect fitting on the exhaust hose of the air compressor (not shown). The base pipe 6 is preferably constructed of a high strength material which is also preferably noncorrosive such as, for example, a cast and machined bronze alloy material.

Figure 2:
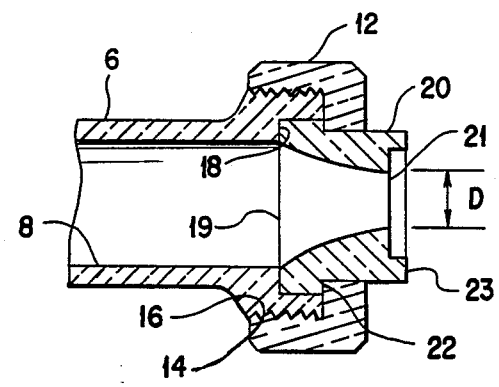
FIG. 2 is a fragmentary, sectional side view of a nozzle attached to the discharge end of the device depicted in FIG. 1.

A ring-shaped locking collar 12 is positioned at the discharge end of the base pipe 6 and includes an internally threaded bore 14 which engages a threaded portion 16 formed on the end of pipe 6, FIG. 2. The outer surface of the locking collar 12 is preferably knurled as shown in FIG. 1 to facilitate manual rotation thereof.

The mass flow meter 2 further includes a pressure gauge 4, or similar pressure responsive device such as a transducer. The gauge 4 has a hollow stem portion 24 which is threadably attached to a bore 26 which is formed through the sidewall of the pipe 6 so as to permit the sensing portion of the pressure gauge to be in communication with the interior of the bore 8 and, thus, respond to the air pressure therein. The gauge 4 also carries a face portion which has imprinted thereon a pressure dial 32 graduated in pounds per square inch (psi) with numeric pressure indicia, for example, ranging from 0 to 160 psi, associated therewith. An indicator needle 30 is attached at its base to a rotatable shaft 28 at the center of the gauge face, which moves in a conventional manner in response to the air pressure sensed within the bore 8. The face of the gauge 4 also has four concentric CFM rings, 34, 36, 38 and 40, respectively, thereon with numeric mass flow rate indicia (in cubic feet per minute) associated with each. As will be explained hereinafter, each of the mass flow rate CFM indicia rings 34, 36, 38 and 40 is calibrated to be read with a particular nozzle 20 of a specific diameter "D" dimension.

The mass flow rate meter 2 may be supplied conveniently as a kit which includes, for example, four converging nozzles 20, wherein each nozzle has a throat 21 with a diameter "D" of a dimension set forth below in Table I. Each nozzle is preferably numbered and also color coded for ease of identification in the field.

TABLE I

| Nozzle No. | Color Code | "D" (Inches) | Pressure (psig) | Mass Flow (cfm) |
|---|---|---|---|---|
| #1 | Green | 0.188 + .001 | 1.5-150 | 15-80 |
| #2 | Blue | 0.265 + .001 | 1.5-150 | 30-160 |
| #3 | Red | 0.325 + .001 | 1.5-150 | 45-240 |
| #4 | Black | 0.375 + .001 | 1.5-150 | 60-320 |

As seen in FIG. 2, the nozzles 20 are fitted at the outlet end of the base pipe 6 snugly received by a flat seat 18 and held in place by the locking collar 12. The nozzles 20 convergingly taper from an inlet portion 19 having a diameter which is equal to the inside diameter of the base pipe bore 8 and smoothly converges to the nozzle throat 21 at the outlet end thereof. An extended edge 23 is also preferably formed on the outlet end of the nozzles 20 to protect the throat 21 from being nicked or otherwise marred during handling. This is important because the exact dimensions of the throat 21 must be maintained so that accurate pressure and mass flow rate reading are generated. The ends 23 of the nozzle 20 may be color coded in accordance with Table I so that a given color identifies a given nozzle throat diameter. This same color coding system is preferably carried over to the face of the pressure gauge 4 wherein the mass flow rate indicia on ring 34, for example, which is marked "CFM1", is color coded in green to match nozzle "No. 1" in Table I. In a similar manner, indicia ring 36 is printed in the color code blue, ring 38 in red, and ring 40 in black.

The sizes of the "D" diameter dimensions chosen for the converging nozzles 20 were so selected to cover a normal range of pressure and flow conditions that are frequently found in field compressors, for example, pressures and flows of up to 150 psig and 300 cubic feet per minute (CFM), respectively. Each nozzle presents a specific cross-sectional area at the throat 21 which provides a specific resistance against which the compressor must operate at a particular flow and permits the measurement of that flow by measuring the pressure upstream from the nozzle. This is possible due to the relationship between the mass flow rate (CFM) in standard cubic feet of free air under choked (sonic) conditions, varies directly with the absolute total pressure upstream of the nozzle 20, and with the area of the nozzle throat 21 and inversely with the square root of the absolute temperature of the air upstream.

The condition may be expressed as follows:

$$\dot{m} \propto \frac{P_o A_t}{\sqrt{T_o}}$$

where:
$\dot{m}$ = mass flow rate (cfm)
$P_o$ = absolute pressure upstream of nozzle
$A_t$ = area of nozzle throat
$T_o$ = absolute air temp. Rankine (or °F.+460°) upstream of nozzle.

It is also known that at choked (sonic) conditions, the ratio of the absolute pressures upstream and downstream of a nozzle should be equal to or greater than 1.89.

Since the exact area of each nozzle 20 is known, the mass flow rate for a given pressure value along the pressure gauge indicia ring 32 can then be calculated and the CFM indicia rings 34-40 on the gauge 4 are then calibrated accordingly using the specific nozzle diameters of Table I for each.

Figure 3:
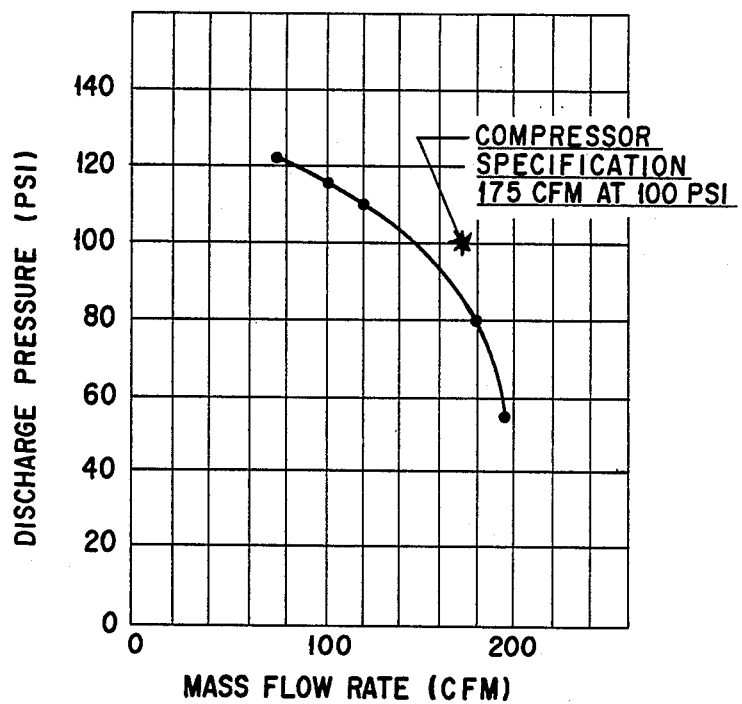
FIG. 3 is a graph of a typical performance curve of the type which is generated from readings obtained by the device of FIG. 1.

In order to examine the performance characteristics of a compressor using the mass flow meter 2, the nozzles 20 should be connected one at a time in sequence to the discharge pipe of the compressor. Each of the nozzles Nos. 1-4 in Table I provides both the resistance against which the compressor has to operate at a particular flow. A pressure and CFM reading is first taken for nozzle No. 1 and then that nozzle is removed from the base pipe 6 and replaced by nozzle No. 2 and similar readings are made. This sequence continues until readings have been obtained for all four nozzles. A typical example of the preformance curve obtained by this method for a 175 cfm - 100 psi rated compressor, that had been in the field for some time, is shown in FIG. 3. A data point was obtained for each of the nozzles in the manner described and plotted on the graph depicted in FIG. 3.

It is readily observed in FIG. 3 that the compressor subject to testing has deteriorated somewhat since its actual performance curve has fallen away from its rated capacity point shown on the graph. The graph of data also indicates to the operator that the particular compressor tested is of sufficient capacity to perform in the region beneath the curve plotted thereon. This is of practical value since the data points of FIG. 3 indicate that the specific compressor tested still possesses sufficient capacity to operate the air excavation tool mentioned above within the supersonic regime as required for proper efficiencies, which usually calls for an air supply within the ranges of about 105-125 cfm and 90-100 psi. As noted in FIG. 3, these required mass flow rates and pressures fall to the left and beneath the performance curve plotted thereon, indicating that the particular compressor will deliver the specified amounts.

In addition to measuring mass flow rates and pressures for positive displacement air compressors and the like, my invention can be modified to measure the performance of vacuum pumps. By using the same principle of multi-nozzles having known cross-sectional areas, the nozzle 20 would be reversed in the end of base tube 6 so that the throat portion 21 is adjacent to the bore 8 (not shown) and the end 10 of the tube 6 would be attached to the suction end of the vacuum pump. It is also possible to further modify the device 2 to permit CFM readings for absolute pressure ratios less than 1.89, that is, for flow rates less than sonic in the throat or, in other words, for a non-chocked condition. The mathematical relationship for this condition is no longer the same as in the choked state but it can be calculated and an appropriate CFM indicia ring for low pressure flows could be prepared on a removable transparent template, for example, and snapped into place over the face plate of gauge 4 as required.

What is claimed is:

1. A device for measuring the mass flow rate of a compressible fluid delivered from a source comprising:

a hollow bored conduit means having an inlet end adapted to be placed into communication with said source and a discharge end including a converging nozzle means fitted therein, said nozzle having a throat section defining a cross-sectional area of a known numeric value;

fluid pressure sensing means including a pressure gauge communicating with the hollow bore of said conduit means in an upstream location from said nozzle means;

locking collar means at the discharge end thereof adapted to detachably receive the nozzle means, whereby nozzle means of differing cross-section areas may be sequentially fitted to the device to obtain a mass flow rate indication for each of said nozzle means; and the gauge having pressure indicia thereon and a plurality of concentric mass flow rate indicia rings each corresponding to a nozzle of different cross-sectional area, whereby a single device enables direct reading of both pressure and mass flow rate for each of the different nozzles.

2. The device of claim 1 wherein the compressible fluid is air and the source is an air compressor.

* * * * *